_United States Patent Office_

3,538,084
Patented Nov. 3, 1970

3,538,084
17-SPIRO-3'-DIAZIRIDINE STEROIDS OF THE ANDROSTANE AND ESTRANE SERIES
Poul Borrevang, Vanlose, and Peter Faarup, Soborg, Denmark, and Jorgen Hjort, Vancouver, British Columbia, Canada, assignors to Novo Terapeutisk Laboratorium A/S, Copenhagen, Denmark
No Drawing. Continuation-in-part of application Ser. No. 547,135, May 2, 1966. This application June 19, 1968, Ser. No. 741,152
Int. Cl. C07c *169/10, 173/10*
U.S. Cl. 260—239.5    20 Claims

ABSTRACT OF THE DISCLOSURE

The new steroid compounds have a diazirine group or a diaziridine group in the 17-position of the steroid molecule. 17-spiro-3'-diaziridine steroids of the androstane and estrane series are prepared by treating the corresponding steroid having in the 17-position of the steroid molecule an imino group, or a group convertible to an imino group such as a keto group, with hydroxyl-amine-O-sulfonic acid in the presence of a basic-reacting agent, such as ammonia or an alkali metal hydroxide. 17-spiro-3'-diaziridine steroids are converted into the corresponding 17-spiro-3'-diaziridine compounds by treatment with an oxidizing agent and 17-spiro-3'-(1'(2')-substituted)-diaziridine steroids are prepared from 17-spiro-3-diazirine steroids by means of organo metallic reactants.

This is a continuation-in-part application of our copending U.S. application Ser. No. 547,135 filed May 2, 1966 and now abandoned.

The present invention relates to novel and useful steroid compounds and to processes for the preparation thereof.

The steroid compounds of the invention are characterized in that carbon atom No. 17 in the steroid molecule is one of the members of a 3-membered ring system containing two nitrogen atoms. Thus, the steroid compounds of the invention may be defined as steroids carrying in 17-position a spiro-diazirine or a spiro-diaziridine ring, which latter may be substituted.

It has been found that the introduction of the said 3-membered ring system into 17-position of steroids opens a new and promising field in the steroid art.

Thus, by the introduction of the said system there may be obtained steroids having valuable pharmacological properties. For example, there may be obtained steroids showing anabolic effect, antiandrogenic effect, hypotensive effect, gonadotropine blocking effect, antifertility effect, and antigestagenic effect.

Furthermore, it has been found that due to the unique chemical properties of the 3-membered ring system, the steroids of the invention are exertemely valuable intermediates for the preparation of other steroid compounds.

According to the invention, it has been found that a 17-spiro-3'-diaziridine ring may be introduced into steroids by treating steroids carrying in 17-position an imino or a keto group with hydroxylamine-O-sulfonic acid in the presence of $NH_3$. When the 17-spiro-3'-diaziridine group has been introduced into the steroid molecule, it may be converted into a diazirine group by oxidation. Substituted diaziridine groups may be formed from diazirine groups by means of organometallic reactants.

In the present specification and claims, the term "imino group" is intended to comprise unsubstituted as well as substituted imino groups. If the steroid used as starting compound contains in the 17-position an unsubstituted imino group, other basic-reacting agents may be used instead of $NH_3$, such as alkali metal hydroxides, though $NH_3$ will generally be preferred. As an example of other basic-reacting agents used in the present may be mentioned potassium hydroxide.

The 17-imino steroids are more readily converted into 17-diaziridine steroids than are the 17-keto steroids, and the preferred starting compounds are in most cases 17-imino-steroids in which the imino group is substituted, preferably with an aliphatic or cycloaliphatic radical; however, when using acids or their ammonium salts, e.g. p-toluenesulfonic acid or its ammonium salt, to promote the reactions, 17-keto steroids may be converted into 17-diaziridine steroids in reasonable yields.

Also when using as starting compounds 17-imino steroids the yield and purity of 17-spiro-3'-diaziridine steroid may in many cases be improved by carrying out the treatment with hydrolyamine-O-sulfonic acid in the presence of p-toluenesulfonic acid or the ammonium salt thereof.

The introduction of the diaziridine ring may be carried out at temperatures for instance from $-30$ to $-40°$ C. up to room temperature or even higher. Sometimes it is preferred to carry out the main part of the reaction at about 0 to 5° C. and let the reaction continued to completion at room temperature. As the solvent medium may be used various of the commonly used solvents with the proviso that a solvent should be selected which is not able to undergo undesired reactions with the reactants used or the products formed. As examples of solvents may be mentioned methanol and dioxane. Though the use of dry solvents is often preferred, the process may also be carried out in the presence of water.

Without limiting the invention to any theory, it is believed that the introduction of the 17-diaziridine group proceeds via the unsubstituted 17-imino group. Thus, if the steroid used as starting compound does not contain an unsubstituted imino group in the 17-position, such group is formed intermediately during the reaction. It will be understood that though only steroids carrying in 17-position an imino or a keto group have been explicity mentioned as starting compounds for the process of the invention, the use of steroids containing in the 17-position other groups which under the reaction conditions are convertible into a free imino group is within the scope of the present invention.

As mentioned above, the diazirine ring is formed by oxidation of the diaziridine ring. As suitable oxidizing agents may be mentioned bromine, silver oxide, tertiary butyl hypochlorite, chromium trioxide and potassium permanganate. The choice of oxidizing agent for use in a given case will depend on various factors, for example substituents present in other position of the steroid molecule.

17 - spiro-3'-(1'(2')-substituted)-diaziridine steroids are prepared by reacting 17-spiro-3'-diazirines with such organometallic compounds as RMg-halogen, in other words Grignard compounds, or LiR, or RZn-halogen, wherein R is the substituent to be introduced into the spiro ring system.

Various reactions may—either simultaneously with or subsequently to the formation of the 17-spiro ring system—take place in other parts of the steroid molecule without opening the 3-membered ring system. Thus, the following reactions may be mentioned:

17 - spiro - 3' - diazirine steroids containing a hydroxy group may be treated with a reactive acid derivative, e.g. an anhydride, a mixed anhydride, or a halide, to form the desired esters of 17-spiro-3'-diazirine steroids;

On the other hand, 17-spiro-3'-diazirine or diaziridine steroids containing an ester group may be hydrolyzed to convert the ester group into a hydroxy group;

17-spiro-3'-diazirine or diaziridine steroids containing a hydroxy group may be oxidized, e.g. with $CrO_3$, to convert the hydroxy group into an oxo group;

An Oppenauer reaction may be carried out, e.g. $\Delta^5$-17- spiro-3'-diazirine steroids carrying in 3-position a hydoxy or formyloxy group may be subjected to Oppenauer synthesis to form the corresponding 3-oxo-$\Delta^4$-17-spio-3'-diazirine steroids; and 17-spiro-3'-diazirine steroids containing a ketal group may be hydrolyzed to convert the ketal group into a keto group.

It may be stated generally that those 17-spiro-3'-diazirine- or diaziridine steroids which carry a hydroxy or an oxo group may be further reacted to form other 17-spiro-3'-diazirine or diaziridine steroids according to various reactions well-known in connection with steroids carrying hydroxy, or oxo groups.

However, the possibility of carrying out reactions elsewhere in the molecule without opening the 3-membered 17-spiro ring system is not restricted to 17-spiro-3'-diazirines and diaziridines carrying hyroxy or oxa groups. Also other 17-spiro-3'-diazridine and diazridine steroids may be subjected to many kinds of reactions elsewhere in the molecule without opening the 3-membered spiro ring system, provided that such reactions do not involve too drastic conditions.

Of special interest is the fact that 17-spiro-3'-diaziridine or diazirine steroids containing an oxo group elsewhere in the molecule, e.g. in the 2- or 3-position, may be treated to convert the keto group into a diaziridine or diazirine group so as to obtain steroids containing more than one of the spiro rings. On the other hand, it is also possible to prepare e.g. dispiro steroids by the processes of the invention by using starting compounds already containing the 3-membered ring system, e.g. in 3-position.

Furthermore, it is possible to introduce spiro-diaziridine rings as well in the 17-position as in another position, e.g. the 2- or 3-position, simultaneously. In this case, a starting steroid is used which besides the 17-imino or keto group contains an imino or a keto group elsewhere in the molecule..

The diaziridines form salts with acids, and it will be understood that diaziridine salts are within the scope of the present invention. As examples of suitable pharmacologically acceptable acids for use in the salt formation may be mentioned hydrochloric acid and citric acid.

Within the scope of the invention are 17-spiro-diaziridine and diazirine steroids of any type, for example steroids of the androstane, gonane, or estrane series.

As examples of the steroid compounds of the invention may be mentioned steroids having a ring C–D configuration corresponding to one of the following partial Formulae I and II (I)    (II)

wherein Z means $$N=\!\!=\!\!N\diagdown C\diagup$$

or $$R_1N\!-\!\!-\!\!NR_2\diagdown C\diagup$$

wherein the symbols $R_1$ and $R_2$ mean hydrogen, alkyl, cycloalkyl, substituted or unsubstituted aralkyl, aryl, or halogenaryl, $R_3$ means lower alkyl,
$R_4$ means hydrogen or halogen,
$R_7$ means hydrogen, halogen, or methyl, and
Y means $CH_2$, $C=O$ $$\underset{H}{\overset{OH}{C\diagup}}\ ,\ \underset{H}{\overset{OH}{C\diagdown}}\ ,\ \underset{H}{\overset{halogen}{C\diagup}}$$

or $$\underset{H}{\overset{halogen}{C\diagdown}}$$

and having a ring A–B configuration corresponding to one of the following partial Formulae III to VI (III)   (IV)   (V)   (VI)

wherein:

$R_5$ means hydrogen or methyl,
$R_6$ means hydrogen, alkyl or cycloalkyl, or together with the oxygen atom $R_6$ forms an ester group,
$R_8$ means hydrogen, methyl, or halogen
$R_9$ means hydrogen or methyl,
$R_{10}$ means hydrogen, methyl, or halogen, chlorine and fluorine being the preferred halogen,
$R_{11}$ means hydrogen, hydroxyl, methyl, or halogen, chlorine being the preferred halogen,
$R_{12}$ means hydrogen or methyl,
$R_{13}$ means alkyl, and
$R_{14}$ means two hydrogen atoms, an oxygen atom, or hydrogen and hydroxyl, or hydrogen and an ester group, or a ketal group, or an imino group, or a diazirine or diaziridine group, which latter may carry substituents, with the proviso that neither the $\Delta^4$ nor the $\Delta^1$ double bond is present when $R_{14}$ is a diazirine or diaziridine group.

These steroid compounds may be prepared by using as starting compounds for the process of the invention steroids corresponding to the above partial formulae wherein Z is an imino or a keto group, while the other symbols have the meanings stated above.

As further examples of the steroid compounds obtainable by the process of the invention may be mentioned steroids having the general formula:

(VII)

wherein Z means $$N=\!\!=\!\!N\diagdown C\diagup$$

or $$R_1N\!-\!\!-\!\!NR_2\diagdown C\diagup$$

wherein the symbols $R_1$ and $R_2$ mean hydrogen, alkyl, cycloalkyl, substituted or unsubstituted aralkyl, aryl, or halogenaroyl, $R_3$ means hydrogen, methyl, or hydroxyl,
$R_4$ means hydrogen, lower alkyl, lower alkenyl, halogen, methoxy, or alkoxyalkyl, preferably methoxymethyl,
$R_5$ means hydrogen or $OR_6$ wherein $R_6$ means hydrogen, alkyl, cycloalkyl, heterocycloalkyl, alkylaminoalkyl, alkenyl, or together with the oxygen atom $R_6$ forms an ester group, $R_7$ means hydrogen, lower alkyl, lower alkenyl, or methoxy, $R_8$ means hydrogen or methyl, $R_9$ means two hydrogen atoms, hydrogen and halogen, two halogen atoms, hydrogen and methyl, or hydrogen and an ester group, and $R_{11}$ means hydrogen or lower alkyl.

These steroid compounds may be prepared by using as starting compounds for the process of the invention steroids of the general Formula VII wherein Z is an imino or a keto group, while the other symbols have the meanings stated above.

As examples of lower alkyl radicals may be mentioned methyl, ethyl, propyl, butyl, pentyl, and hexyl.

As examples of lower alkenyl radicals may be mentioned ethenyl, propen-1-yl, allyl, buten-3-yl, penten-1-yl, and hexen-1-yl.

As examples of alkyl radicals may be mentioned lower alkyl and the higher alkyls, e.g. heptyl, octyl, nonyl, decyl, undecyl and dodecyl, including branched-chain isomers.

As examples of cycloalkyl radicals may be mentioned cyclopropyl, cyclobutyl, cyclopentyl, cyclohexyl, and cycloheptyl.

As examples or aralkyl radicals may be mentioned benzyl, phenylethyl, and phenylpropyl, and as examples of substituted aralkyl radicals may be mentioned p-nitrobenzyl, p-fluorobenzyl, and toluylmethyl.

As examples of aryl radicals may be mentioned phenyl and naphthyl.

As examples of halogenaryl radicals may be mentioned p-fluorophenyl and fluoronaphthyls.

As examples of alkoxyalkyl radicals may be mentioned methoxymethyl, ethoxyethyl, ethoxypropyl, and butoxymethyl.

As an example of eterocycloalkyl radicals may be mentioned tetrahydropyranyl.

As examples of alkylaminoalkyl radicals may be mentioned 2-dimethylaminoethyl, 2-diethylaminoethyl, and 3-dimethylaminopropyl.

As examples of ester groups may be mentioned formate acetate, propionate, cyclopentylpropionate, cyclohexylpropionate, oenanthate, sulfoacetate, p-chlorphenoxyacetate, phenylpropionate p-hexoxyphenylpropionate, and solubilizing ester groups, such as hemisuccinate and salts thereof, and sulfate and salts thereof.

As examples of halogens may be mentioned chlorine, bromine and fluorine.

Among the novel compounds which are prepared by the process of the invention the following are of special interest:

$3\beta$-hydroxy-$\Delta^5$-androstene-17-spiro-3'-diaziridine and -diazirine, $3\beta$-acetoxy-$\Delta^5$-androstene-17-spiro-3'-diazirine, 3-oxo-$\Delta^4$-androstene-17-spiro-3'-diazirine, $3\alpha$1hydroxy-$5\alpha$-androstane-17-spiro-3'-diaziridine, $3\alpha$-methoxy-$5\alpha$-androstane-17-spiro-3'-diazirine, $5\alpha$-androstane-3-spiro-3'-diazirine-17-spiro-3''-diazirine, and 3-hydroxyestra-1,3,5(10)-triene-17-spiro-3'-diaziridine.

The following novel compounds which are prepared by the process of the invention are also of interest:

$3\beta$-hydroxy-$5\alpha$-androstane-17-spiro-3'-diaziridine and -diazirine, $3\beta$-acetoxy-$5\alpha$-androstane-17-spiro-3'-diazirine, 3-oxo-$5\alpha$-androstane-17-spiro-3'-diazirine, $3\beta$-hydroxy-$\Delta^5$-androstene-17-spiro-3'-(1'(2')-methyl)-diaziridine, 3-oxo-$\Delta^4$-estrene-17-spiro-3'-diazirine, 3-methoxyestra-1,3,5(10)-triene-17-spiro-3'-diaziridine, 3-methoxyestra-1,3,5(10)-triene-17-spiro-3'-(1'(2')-cyclohexyl)-diaziridine, 3-oxo-$\Delta^{1}$-$5\alpha$-androstene-17-spiro-3'-diazirine, 3-oxo-$\Delta^{1,4}$-androstadiene-17-spiro-3'-diazirine, 3-oxo-1-methyl-$\Delta^{1}$-$5\alpha$-androstene-17-spiro-3'-diazirine, $9\alpha$-fluoro-$11\beta$-hydroxy-3-oxo-$\Delta^4$-androstene-17-spiro-3'-diazirine, $9\alpha$-fluoro-$11\beta$-hydroxy-3-oxo-$\Delta^{1,4}$-androstadiene-17-spiro-3'-diazirine, 3,11-dioxo-$\Delta^4$-androstene-17-spiro-3'-diazirine, $3\beta$-hydroxy-11-oxo-$\Delta^5$-androstene-17-spiro-3'-diaziridine and -diazirine, $3\beta$-hydroxy-$\Delta^{5,9(11)}$-androstadiene-17-spiro-3'-diaziridine and -diazirine, 3-oxo-$11\beta$-hydroxy-$\Delta^{1,4}$-androstadiene-17-spiro-3'-diazirine, $3\beta$-hydroxy-$9\alpha,11\beta$-dichloro-$\Delta^5$-androstene-17-spiro-3'-diaziridine and -diazirine, 3-oxo-$9\alpha 11\beta$-dichloro-$\Delta^4$-androstene-17-spiro-3'-diazirine, $\Delta^2$-$5\alpha$-androstene-17-spiro-3'-diaziridine and -diazirine, 3-oxo-$5\beta$-androstane-17-spiro-3'diaziridine and diazirine, 3-cyclopentoxy-$\Delta^{3,5}$-androstadiene-17-spiro-3'-diaziridine and -diazirine, $3\beta$-hydroxy-$\Delta^4$-androstene-17-spiro-3'-diaziridine and -diaziridine 3-oxo-4-methyl-$\Delta^4$-androstene-17-spiro-3'-diazirine, 3-oxo-$2\alpha$-methyl-$^4\Delta$-androstene-17-spiro-3'-diazirine, 3-oxo-$2\alpha$-fluoro-$\Delta^4$-androstene-17-spiro-3'-diazirine, 3-oxo-4-hydroxy-$\Delta^4$-androstene-17-spiro-3'-diazirine, 3-oxo-4-chloro-$\Delta^4$-androstene-17-spiro-3'-diazirine, 3-oxo-$7\alpha$-methyl-$\Delta^4$-androstene-17-spiro-3'-diazirine, 3-oxo-$6\alpha$-methyl-$\Delta^4$-androstene-17-spiro-3'-diazirine, $\Delta^4$-androstene-17-spiro-3'-diaziridine and -diazirine, 3-methoxy-$\Delta^{2,5(10)}$-estradiene-17-spiro-3'-diaziridine and -diazirine, 3-oxo-$\Delta^{5(10)}$-estrene-17-spiro-3'-diazirine, $3\beta$-hydroxy-$\Delta^4$-estrene-17-spiro-3'-diaziridine and -diazirine, $3\beta$-acetoxy-$\Delta^4$-estrene-17-spiro-3'-diazirine, 3-oxo-$6\alpha$-fluoro-$\Delta^4$-androstene-17-spiro-3'-diazirine, $3\beta,6\beta$-dihydroxy-$5\alpha$-bromo-androstane-17-spiro-3'-diaziridine and -diazirine, $16\alpha$-fluoro-3-oxo-$\Delta^4$-androstene-17-spiro-3'-diazirine, 16-methyl-3-oxo-$\Delta^4$-androstene-17-spiro-3'-diazirine, $3\beta$-hydroxy-$\Delta^{5,7}$-androstadiene-17-spiro-3'-diaziridine and -diazirine, 3-acetoxy-$\Delta^{3,5}$-estradiene-17-spiro-3'-diaziridine and -diazirine, 2,3,4-trimethoxyestra-1,3,5(10)-triene-17-spiro-3'-diaziridine and -diazirine, 3-(2-dimethylamino)-ethoxyestra-1,3,5(10)-triene-17-spiro-3'-diaziridine and -diazirine, $16\alpha$-fluoro-3-methoxyestra-1,3,5(10)-triene-17-spiro-3'-diaziridine and -diazirine, $5\alpha$-androstane-3-spiro-3'-diaziridine-17-spiro-3''-diazirine, $5\alpha$-androstane-3-spiro-3'-(1'(2')-methyl)-diaziridine-17-spiro-3''-diazirine, $5\alpha$-androstane-3-spiro-3'-(1',2'-dimethyl)-diaziridine-17-spiro-3''-diazirine, $5\alpha$-androstane-3-spiro-3'-(1'(2')-methyl)-diaziridine-17-spiro-3''-(1''(2''))-methyl)-diaziridine, 3-oxo-$\Delta^4$-gonene-$13\beta$-ethyl-17-spiro-3'-diazirine, 3-methoxygona-1,3,5(10)-triene-$13\beta$-ethyl-17-spiro-3'-diaziridine and -diazirine, 3-methoxygona-2,5(10)-diene-$13\beta$-ethyl-17-spiro-3'-diaziridine and -diazirine, $\Delta^4$-estrene-17-spiro-3'-diaziridine and -diazirine, 2-methyl-$\Delta^2$-$5\alpha$-androstene-17-spiro-3'-diaziridne and -diazirine, 2-cyano-$\Delta^2$-$5\alpha$-androstene-17-spiro-3'-diaziridine and -diazirine, $\Delta^{3,5}$-androstadiene-17-spiro-3'-diaziridine and diazirine, 3-oxo-$7\alpha$-methyl-$\Delta^4$-estrene-17-spiro-3'-diazirine, 3-oxo-4,4-dimethyl-Δ⁵-androstene-17-spiro-3′-diazirine,
3-methylene-Δ¹-5α-androstene-17-spiro-3′-diaziridine and -diazirine,
3-oxo-6α,16α-dimethyl-Δ⁴-androstene-17-spiro-3′-diazirine,
3β-hydroxy-Δ⁵-androstene-17-spiro-3′-(1′(2′)-cyclohexyl)-diaziridine,
3β-hydroxy-Δ⁵-androstene-17-spiro-3′-(1′(2′)-benzyl)-diaziridine,
2,3-dimethoxyestra-1,3,5(10)-triene-17-spiro-3′-diaziridine and -diazirine,
2-methoxymethyl-3-methoxyestra-1,3,5(10)-triene-17-spiro-3′-diaziridine and -diazirine,
3β-(2-dimethylamino-ethoxy)-Δ⁵-androstene-17-spiro-3′-diaziridine and -diazirine,
2-dimethylaminomethylene-3-oxo-5α-17-spiro-3′-diazirine,
2-dimethylaminomethylene-3-oxo-5α-17-spiro-3′-diazirine,
3β-hydroxy-6-methyl-Δ⁵-androstene-17-spiro-3′-diaziridine and -diazirine,
2α-methyl-3-oxo-5α-androstane-17-spiro-3′-diaziridine and -diazirine,
3-oxo-6-chloro-Δ⁴,⁶-androstadiene-17-spiro-3′-diazirine,
3-oxo-6-methyl-Δ⁴,⁶-androstadiene-17-spiro-3′-diazirine,
6α-trifluoromethyl-3-oxo-Δ⁴-androstene-17-spiro-3′-diazirine,
1,2α-methylene-6-chloro-3-oxo-Δ⁴,⁶-androstadiene-17-spiro-3′-diazirine,
Δ³-estrene-17-spiro-3′-diaziridine and -diazirine,
estra-1,3,5(10)-triene-17-spiro-3′-diaziridine and -diazirine,
3β-hydroxy-Δ¹⁽¹⁰⁾,⁵-estradiene-17-spiro-3′-diaziridine and -diazirine,
3-cyclopentoxy-Δ³,⁵-estradiene-17-spiro-3′-diaziridine and -diazirine,
3-oxo-Δ⁴,¹⁴-androstadiene-17-spiro-3′-diazirine,
3β-hydroxy-3α-ethinyl-Δ⁵-androstene-17-spiro-3′-diaziridine and -diazirine,
3-oxo-Δ⁴,⁶-androsadiene-17-spiro-3′-diazirine,
3-oxo-Δ¹,⁴,⁶-androstatriene-17-spiro-3′-diazirine,
5α-androstane-3-spiro-3′-(1′,2′-dimethyl)-diaziridine-17-spiro-3″-(1″(2″)-methyl)-diaziridine,
3-oxo-Δ⁴-B-norandrostene-17-spiro-3′-diazirine,
3-oxo-6-fluoro-Δ⁴,⁶-androstadiene-17-spiro-3′-diazirine,
2-oxo-Δ³-A-norandrostene-17-spiro-3′-diazirine,
3-oxo-Δ⁴,⁹-estradiene-17-spiro-3′-diazirine and
5α-androstane-2-spiro-3′-diazirine-17-spiro-3″-diazirine.

The following examples illustrate the preparation of the steroids of the invention and also the therapeutic effect and the uitility of the compound produced.

The various tests referred to are carried out in agreement with the following literature references and test descriptions:

(1) E. Eisenberg & G. Gordan: J. Pharmacol. Exp. Ther. 1950, 99, p. 38.
(2) L. G. Hershberger et al.: Proc. Soc. Exp. Biol. Med. 1953, 83, p. 175.
(3) B. L. Rubin et al.: Endocrinology, 1951, 49, p. 429.
(4) C. Clauberg: Zentralblatt für Gynäkologie, 1930, 44, p. 2757.
(5) F. Sauerbruck & M. Heyde: Münchener Med. Woschr., 1908, 1, p. 153.
(6) Test for Influence on Fertility: Female rats (200–250 g.), pregnant once, are given the compound to be tested subcutaneously or orally in the six first days of pregnancy. The animals are killed on the 18th day and number and size of the embryos are noticed.
(7) General Endocrine Screen (GES-test): Infantile male rats (about 125 g.) are given the compound to be tested subcutaneously or orally for 12 days. On the 13th day the animals are killed and the following organs are taken out and weighed: Prostate, vesiculae seminalis, musculus levator ani (MLA), testes, thyreoidea, thymus, adrenal glands, and the preputial gland.

The usual ranges of doses in connection with the various tests are as follows:

(a) Androgenic test (oral administration) ad mod. Hershberger: 30–200 mg./kg./day for 10 days in male rats of about 100 g.
(b) Androgenic test (subcutaneous administration) ad mod. Eisenberg & Gordan: 0.3–2.0 mg./kg./day for 7 days in male rats of about 200 g.
(c) Anti-adrogenic test (subcutaneous and oral administration) ad mod. Eisenberg & Gordan: 0.2–20 mg./kg./day for 7 days, while administering at the same time cubcutaneously testosterone propionate in male rats of about 200 g. (0.15 mg./kg./day).
(d) Estrogenic test (subcutaneous and oral administration) ad mod. Rubin: 10–10.000μ g./kg./day for 3 days in female mice of about 15 g.
(e) Anti-estrogenic test: like the estrogenic test, while administering at the same time subcutaneously estrone in female mice of about 15 g. (10μ g./kg./day).
(f) Gestragenic test (subcutaneous and oral administration) ad mod. Clauberg: 0.1–1 mg./kg./day for 5 days in female rabbits of about 1 kg.
(g) Anti-gestagenic test: like the gestagenic test, while administering at the same time subcutaneously progesterone in female rabbits of about 1 kg.
(h) Gonadotropine blocking (subcutaneous and oral administration) ad mod. Sauerbruck & Heyde: 0.1–1 mg./kg./day for 10 days in male rats of about 100 g.
(i) Influence on fertility (subcutaneous and oral administration): 0.5–10 mg./kg./day for 6 days.
(j) General Endocrine Screen (subcutaneous and oral administration): about 8 mg./kg./day for 12 days.

EXAMPLE 1

3β-hydroxy-Δ⁵-androstene-17-spiro-3′-diaziridine (A) Preparation from Schiff's base.—100.0 g. of trans-dehydroandrosterone were dissolved in 1000 ml. of cyclohexylamine. The solution was refluxed for 20 hours, while dry nitrogen was bubbled through, and then evaporated to dryness in vacuo. The resulting residue was recrystallized from ethyl acetate. In this manner there was obtained 101.0 g. of 3β-hydroxy-Δ⁵-androstene-17-cyclohexylimine with a melting point of 140–144° C. The infrared spectrum (KBr) showed a characteristic band at 1675 cm.⁻¹ (C=N).

The above 101.0 g. of 3β-hydroxy-Δ⁵-androstene-17-cyclohexylimine were dissolved in 4000 ml. of dry methanol, and 680 ml. of methanolic ammonia (4.0 molar) were added. The solution was cooled in a mixture of ice and water, and then 47.5 g. of hydroxylamine-O-sulfonic acid (98%) were added portionwise with stirring. After stirring for a couple of hours in the cold and then for about 20 hours at room temperature the reaction mixture was evaporated almost to dryness in vacuo. Methylene chloride was added, the mixture was shaken three times with water, and the methylene chloride phase was dried over $Na_2SO_4$ and evaporated to dryness in vacuo. To the residue there was added about 500 ml. of boiling acetone, and upon cooling the precipitated substance was separated by filtration. In this manner there was obtained 48.0 g. of 3β-hydroxy-Δ⁵-androstene-17-spiro-3′-diaziridine. After recrystallization from acetone a melting point of 198–203° C. was obtained.

Analysis.—Calc'd for $C_{19}H_{30}N_2O$ (percent): C, 75.46; H, 10.00; N, 9.26. Found (percent): C, 75.46; H, 9.94; N, 9.21.

The infrared spectrum (KBr) showed no band for C=N, but a characteristic band at 3210 cm.⁻¹ (NH).

While in the above procedure the 17-cyclohexylimino compound was employed, other Schiff's bases may also be employed, e.g. the 17-methylimine or 17-(n-butyl)-imine compound, which for instance may be prepared in the following manner:

methanolic ammonia (5 molar) and 23.0 g. of hydroxylamine-O-sulfonic acid (95%). After evaporation of the methylene chloride the resulting residue was recrystallized from acetone, yielding 26.7 g. of 3β-hydroxy-5α-androstane-17-spiro-3'-diaziridine. The infrared spectrum (KBr) showed no band for C=N, but a characteristic band at 3205 cm.$^{-1}$ (NH).

(2) 3β - acetoxy-5α-androstane-17-spiro-3'-diazirine.—26.2 g. of 3β-hydroxy-5α-androstane-17-spiro-3'-diaziridine were admixed with 2600 ml. of ether and 26.0 ml. of triethylamine. With stirring and cooling in a mixture of ice and water, a solution of 13.8 g. of Br$_2$ in 150 ml. of carbon tetrachloride were added dropwise in the course of 3 hours. After the addition was finished, stirring was continued for one more hour, and then there was washed with water, sodium bicarbonate solution and water. The ether solution was dried over Na$_2$SO$_4$ and evaporated to dryness in vacuo. The resulting residue (3β-hydroxy-5α-androstane-17-spiro-3'-diazirine) was dissolved in a mixture of 100 ml. of acetic anhydride and 200 ml. of pyridine. After standing for 20 hours at room temperature, ether was added, and the mixture was shaken out with dilute acetic acid, water, Na$_2$CO$_3$ solution and water. The ether solution was dried over Na$_2$SO$_4$ and evaporated to dryness in vacuo. The resulting residue was dissolved in benzene and chromatographed over silica gel (500 g.). Eluation with benzene yielded 22.3 g. of 3β-acetoxy-5α-androstane-17-spiro-3'-diazirine. The infrared spectrum (KBr) showed the characteristic band for N=N at 1578 cm$^{-1}$.

(3) 3β - hydroxy-5α-androstane-17-spiro-3'-diazirine.—22.3 g. of the above 3β-acetoxy-5α-androstane-17-spiro-3'-diazirine were dissolved in 900 ml. of methanol, and a solution of 12.0 g. of potassium carbonate in 120 ml. of water was added. After heating to 40° C. for a short while the reaction mixture was allowed to stand for 20 hours at room temperature. After addition of methylene chloride there was shaken out 3 times with water, dried over Na$_2$SO$_4$ and was evaporated to dryness in vacuo. In this manner there was obtained 17.9 g. of 3β-hydroxy-5α-androstane-17-spiro-3'-diazirine, which after recrystallization from aqueous methanol had a melting point of 105–110° C.

(4) 3-oxo-5α-androstane-17-spiro-3'-diazirine.—1.0 g. of 3β-hydroxy-5α-androstane-17-spiro-3'-diazirine (crude) was dissolved in 15.0 ml. of pyridine and with stirring added to a suspension of 1.2 g. of CrO$_3$ in 15.0 ml. of pyridine. After standing at room temperature for 20 hours ethyl acetate was added, and a filtration through "hyflo" was performed. The filtrate was shaken out with dilute hydrochloric acid, Na$_2$CO$_3$ solution and water, and the ethyl acetate solution was dried over Na$_2$SO$_4$ and evaporated to dryness in vacuo. The resulting residue was recrystallized from methanol, yielding 0.5 g. of 3-oxo-5α-androstane-17-spiro-3'-diazirine with a melting point of 126–128° C. The infrared spectrum showed characteristic bands at 1585 cm.$^{-1}$ (N=N) and 1711 cm.$^{-1}$ (C=O).

*Analysis.*—Calc'd for C$_{19}$H$_{29}$N$_2$O (percent): C, 75.96; H, 9.39; N, 9.32. Found (percent): C, 76.02; H, 9.04; N, 9.40. The compound is a useful intermediate for producing the compound in Example 3.

EXAMPLE 5

3α-hydroxy-5α-androstane-17-spiro-3'-diaziridine 40.0 g. of androsterone were treated with 400 ml. of cyclohexylamine in the manner described in Example 1, method A. In this manner there was obtained 49.0 g. of 3α-hydroxy-5α-androstane - 17 - cyclohexylimine with a melting point of 157–159° C. The infrared spectrum (KBr) showed a characteristic band at 1665 cm.$^{-1}$ (C=N).

48.4 g. of the above 17-cyclohexylimine were dissolved in 1400 ml. of dry methanol and treated in a manner corresponding to the one described in Example 1, method A, adding 250 ml. of methanolic ammonia (5.2 molar) and 22.0 g. of hydroxylamine-O-sulfonic acid (98%). After evaporation of the methylene chloride solution the residue became crystalline by treatment with a mixture of methanol and ethyl acetate. After recrystallization from acetone there was obtained 8.3 g. of 3α-hydroxy-5α-androstane-17-spiro-3'-diaziridine with a melting point of 192–198° C. By concentrating the mother liquor there was obtained additionally 8.4 g.

The infrared spectrum (KBr) showed no band for C=N, but a characteristic band at 3180 cm.$^{-1}$ (NH).

*Analysis.*—Calc'd for C$_{19}$H$_{32}$N$_2$O (percent): C, 74.95; H, 10.59; N, 9.20. Found (percent): C, 74.66; H, 10.61; N, 9.25.

In biological tests, 3α-hydroxy-5α-androstane-17-spiro-3'-diaziridine showed the same oral anabolic (myotrophic) effect as 17α-methyl testosterone, but an oral androgenic effect of only ⅓ of that of this reference compound. After subcutaneous administration in doses ≦ 15 mg./kg./day only a poor androgenic activity was found.

EXAMPLE 6

3α-acetoxy-5α-androstane-17-spiro-3'-diazirine 9.0 g. of the 3α-hydroxy-5α-androstane-17-spiro-3'-diaziridine described in Example 5 were admixed with 900 ml. of ether and 9.0 ml. of triethylamine and treated in the same manner as described in Example 4, 2, adding dropwise a solution of 4.7 g. of Br$_2$ in 50 ml. of carbon tetrachloride in the course of 90 minutes, and using in the acetylation a mixture of 20.0 ml. of acetic anhydride and 40.0 ml. of pyridine. The resulting residue was recrystallized from methanol. In this manner there was obtained 7.7 g. of 3α-acetoxy-5α-androstane-17-spiro-3'-diazirine with a melting point of 137–139° C. The infrared spectrum (KBr) showed characteristic bands at 1245 cm.$^{-1}$ (C—O—C), 1577 cm.$^{-1}$ (N=N) and 1727 cm.$^{-1}$ (C=O).

*Analysis.*—Calcd. for C$_{21}$H$_{32}$N$_2$O$_2$ (percent): C, 73.22; H, 9.36; N, 8.13. Found (percent): C, 73.15; H, 9.46; N, 8.33.

When administered subcutaneously in doses of about 15 mg./kg./day for 7 days the compound showed some antiandrogenic effect.

EXAMPLE 7

3α-methoxy-5α-androstane-17-spiro-3'-diazirine (1) 3α - methoxy - 5α - androstane - 17 - spiro - 3'-diaziridine.—40.0 g. of 3α-methoxy-5α-androstane-17-one (J. Med. Chem. 7, p. 119 (1964)) were dissolved in 400 ml. of cyclohexylamine and treated in the same manner as described in Example 1, method A, with the exception that the resulting residue was evaporated once more after addition of ethyl acetate. On recrystallization from n-hexane the residue thus obtained yielded 39.5 g. of 3α-methoxy-5α-androstane-17-cyclohexylimine with a melting point of 115–117° C. The infrared spectrum (KBr) showed a characteristic band at 1673 cm.$^{-1}$ (C=N).

39.5 g. of the above 17-cyclohexylimine were dissolved in 1000 ml. of dry methanol and then treated as described in Example 1, method A, adding 220 ml. of methanolic ammonia (4.7 molar) and 17.8 g. of hydroxylamine-O-sulfonic acid (98%). On addition of acetone to the residue the latter crystallized, and by separation by filtration there was obtained 13.0 g. of 3α-methoxy-5α-androstane-17-spiro-3'-diaziridine. The infrared spectrum (KBr) showed no band for C=N, but a characteristic band at 3215 cm.$^{-1}$ (NH).

(2) 3α - methoxy - 5α - androstane - 17 - spiro - 3'-diazirine.—7.7 g. of the 17-diaziridine described above were dissolved in 100.0 ml. of chloroform and treated in the same manner as described in Example 2, 1, adding 15.0 ml. of triethylamine and in the course of 30 minutes a solution of 3.9 g. of Br$_2$ in 25.0 ml. of chloroform. After working up the residue was treated with methanol, which 10.0 g. of transdehydroandrosterone were dissolved in a mixture of 75 ml. of dry ethanol and 75 ml. of n-butyl amine, and after refluxing for 6 hours there was evaporated to dryness in vacuo. The resulting residue was recrystallized from ethyl acetate and yielded 7.5 g. of $3\beta$-hydroxy-$\Delta^5$-androstene-17-(n-butyl)-imine.

(B) Preparation from 17-imine.—1.0 g. of $3\beta$-hydroxy - $\Delta^5$ - androstene-17-imine (J. Schmidt-Thomé, Ber. 88 p. 895 (1955)) was dissolved in 80 ml. of dry methanol. The solution was cooled in a mixture of ice and water, and 6.0 ml. of methanolic ammonia (2.3 molar) were added. Thereafter, 0.43 g. of hydroxylamine-O-sulfonic acid (98%) was added portionwise with stirring. After stirring for a couple of hours in the cold and thereafter for about 20 hours at room temperature the reaction mixture was evaporated almost to dryness in vacuo. Methyl chloride was added, the mixture was washed three times with water, and the methylene chloride phase was dried over $Na_2SO_4$ and evaporated to dryness in vacuo. On recrystallization from acetone there was obtained 0.18 g. of 17-spiro-diaziridine identical with the substance described in A.

(C) Preparation from 17-keto.—1.0 g. of transdehydroandrosterone was suspended in 35.0 ml. of dry methanol, and there was added 5.15 ml. of methanolic ammonia (5.4 molar), 3.3 g. of the ammonium salt of p-toluenesulfonic acid, and, with stirring, 0.83 g. of hydroxylamine-O-sulfonic acid (95%).

After stirring for about 24 hours at room temperature, additionally 0.42 g. of hydroxylamine-O-sulfonic acid was added, and thereafter stirring was continued for additionally about 72 hours. Thereafter, methylene chloride was added, and the mixture was shaken out three times with water. The methylene chloride phase was dried over $Na_2SO_4$ and evaporated to dryness in vacuo. In this manner there were obtained 820 mg. of a residue, which according to thin layer chromatography showed a content of 30% of the substance described in A.

In biological tests (peroral administration to DOCA hypertensive rats) $3\beta$-hydroxy-$\Delta^5$- androstene-17-spiro-3'-diaziridine produced the same degree of blood pressure decrease as guanethidine. Dose: 10 mg./kg./day for 10 days. Oral administration of doses of about 100 mg./kg./day for 10 days gave an androgenic effect only about 25% of that of methyltestosterone. Subcutaneous administration of doses up to 15 mg./kg./day for 7 days resulted in no androgenic effect. Thus, the compound is in possession of a good antihyposensitive effect and a low androgenic effect.

EXAMPLE 2

$3\beta$-acetoxy-$\Delta^5$-androstene-17-spiro-3'-diazirine (1) $3\beta$ - hydroxy-$\Delta^5$-androstene-17-spiro-3'-diazirine.—40.0 g. of the $3\beta$-hydrovy-$\Delta^5$-androstene-17-spiro-3'-diaziridine described in Example 1 (crude) were dissolved in 1500 ml. of chloroform, the solution was cooled in a mixture of ice and water, and 36.5 ml. of triethylamine were added. With vigorous stirring, a solution of 42.0 g. of $Br_2$ in 400 ml. of chloroform were added dropwise in the course of about 3½ hours. After stirring for additionally half an hour the reaction mixture was washed once with sodium thiosulfate solution and twice with water, and the chloroform phase was dried over $Na_2SO_4$ and evaporated to dryness in vacuo. The resulting residue was dissolved in 500 ml. of acetone, and a solution of 200 g. of sodium iodine in 1500 ml. of acetone was added. After standing for about 16 hours at room temperature ether was added, and the mixture was shaken twice with sodium thiosulfate solution and twice with water. The etherial solution was dried over $Na_2SO_4$ and evaporated to dryness in vacuo. In this manner there was obtained 38.7 g. of $3\beta$-hydroxy-$\Delta^5$-androstene-17-spiro-3'-diazirine. The infrared spectrum (KBr) showed a characteristic band at 1577 cm.$^{-1}$ (N=N).

(2) $3\beta$ - acetoxy-$\Delta^5$-androstene-17-spiro-3'-diazirine.—

The above 38.7 g. of $3\beta$-hydroxy-$\Delta^5$-androstene-17-spiro-3'-diazirine were dissolved in a mixture of 150 ml. of acetic anhydride and 300 ml. of pyridine. After standing at room temperature for about 16 hours ether was added, and the mixture was shaken with water, dilute acetic acid, water $Na_2CO_3$ solution and at last again with water. The ether solution was dried over $Na_2SO_4$ and evaporated to dryness in vacuo. On recrystallization from methanol there was obtained 27.7 g. of $3\beta$-acetoxy-$\Delta^5$-androstene-17-spiro-3'-diazirine with a melting point of 118–121° C. The infrared spectrum (KBr) showed characteristic bands at 1237 cm.$^{-1}$ (C—O—C), 1576 cm.$^{-1}$ (N=N) and 1730 cm.$^{-1}$ (C=O).

*Analysis.*—Calc'd for $C_{21}H_{30}N_2O_2$ (percent): C, 73.65; H, 8.83; N, 8.18. Found (percent): C, 73.50; H, 8.94; N, 8.24.

In biological tests (peroral administration to DOCA hypertensive rats), $3\beta$-acetoxy-$\Delta^5$-androstene-17-spiro-3'-diazirine produced the same degree of blood pressure decrease as guanethidine (Dose: 10 mg./kg./day for 10 days). Besides, $3\beta$ - acetoxy-$\Delta^5$-androstene-17-spiro-3'-diazirine offers the advantage of being without hormonal effect. In doses $\leq$200 mg./kg./day for 3 days subcutaneous administration gave no antiestro-genic effect, and in doses $\leq$15 mg./kg./day for 7 days subcutaneous administration gave no androgenic and no antiandrogenic effect. There was found no androgenic activity by oral administration is does $\leq$100 mg./kg./day for 10 days.

EXAMPLE 3

3-oxo-$\Delta^4$-androstene-17-spiro-3'-diazirine 28.7 g. of the $3\beta$-hydroxy-$\Delta^5$-androstene-17-spiro-3'-diazirine described in Example 2 were dissolved in a mixture of 215 ml. of dry acetone and 430 ml. of dry benzene. 24.0 g. of powdered aluminium isopropylate were added, and the mixture was refluxed for 8 hours. The reaction mixture was thereafter cooled, ether was added, and the resulting mixture was shaken with dilute acetic acid, water, $Na_2CO_3$ solution and at last again with water. The organic phase was dried over $Na_2SO_4$ and evaporated to dryness in vacuo. The residue was recrystallized from methanol, and after one more recrystallization there was obtained 7.2 g. of 3-oxo-$\Delta^4$-androstene-17-spiro-3'-diazirine with a melting point of 147–149° C.

The ultraviolet spectrum showed a maximum at 240 m$\mu$ ($\epsilon$=16900) in 96% ethanol, and the infrared spectrum (KBr) showed characteristic bands at 1577 cm.$^{-1}$ (N=N), 1614 cm.$^{-1}$ (C=C) and 1660 cm.$^{-1}$ (C=O).

*Analysis.*—Calc'd for $C_{19}H_{26}N_2O$ (percent): C, 76.47; H, 8.78; N, 9.38. Found (percent): C, 76.23; H, 8.64; N, 9.54.

In biological tests (peroral administration to DOCA hypertensive rats), 3-oxo-$\Delta$4-androstene-17-spiro-3'-diazirine produced the same degree of blood pressure decrease as guanethidine, as well in comparative tests with doses of 5 mg./kg./day for 10 days as in comparative tests with doses of 10 mg./kg./day for 10 days. Oral administration resulted in an androgenic effect corresponding to about 20–25% of that of methyltesto sterone, and after subcutaneous administration in doses $\leq$ about 15 mg./kg./day no androgenic, but an antindrogenic effect was seen.

EXAMPLE 4

3-oxo-5 $\alpha$-androstane-17-spiro-3'-diazirine (1) $3\beta$-hydroxy-5$\alpha$-androstane-17-spiro-3'-diazirdine.—45.0 g. of epiandrosterone were treated with 450 ml. of cyclohexylamine in a manner corresponding to that described in Example 1, method A. There was obtained 51.1 g. of $3\beta$-hydroxy-5$\alpha$-androstane-17-cyclohexylimine with a melting point of 151–155° C. The infrared spectrum (KBr) showed a characteristic band at 1673 cm.$^{-1}$ C=N).

The above 51.8 g. of 17-cyclohexylimine were then treated in the same manner as described in Example 1, method A, using 1500 ml. of dry methanol, 280 ml. of caused it to crystallize. After separation by filtration the substance was recrystallized from methanol. In this manner there was obtained 4.5 g. of 3α-methoxy-5α-androstane-17-spiro-3'-diazirine with a melting point of 136–140° C. The infrared spectrum (KBr) showed a characteristic band at 1578 cm.$^{-1}$ (N=N).

Analysis.— Calcd. for $C_{20}H_{32}N_2O$ (percent): C, 75.90; H, 10.19; N, 8.85. Found (percent): C, 76.00; H, 10.07; N, 8.69.

3α-methoxy-5α-androstane-17-spiro-3'-diazirine showed antiandrogenic effect by subcutaneous administration of 8 mg./kg./day for 12 days (GES-test).

EXAMPLE 8

5α-androstane-3-spiro-3'-diazirine-17-spiro-3''-diaziridine 30.0 g. of 5α - androstane - 17 - one - 3 - spiro - 3' - diazirine (Example 20 in Belgian Pat. No. 656,350) were admixed with 800 ml. of dry methanol, 800 ml. of cyclohexylamine and 60.0 g. of dry p-toluene-sulfonic acid and refluxed for 3 hours. Thereafter, there was distilled off in vacuo, whereupon 2 liters of an ice-cooled mixture of hexane/ether (1:1) were added. After shaking out and subsequently washing twice with ice water, the organic phase was dried over MgSO$_4$ and evaporated to dryness in vacuo (maximum bath temperature 35° C.). The resulting residue was dried in exsiccator over P$_2$O$_5$ and recrystallized from 1700 ml. of dry methanol by gentle heating. In this manner, there were obtained 21.0 g. of 5α-androstane-3-spiro-3'-diazirine-17-cyclohexylimine with a melting point of 152–154° C. The infrared spectrum (KBr) showed bands at 1575 cm.$^{-1}$ (N=N) and 1672 cm.$^{-1}$ (C=N). From the mother liquor additionally 6.5 g. were obtained.

21.0 g. of the above 17-cyclohexylimino compound were treated in the manner previously described, using 2500 ml. of dry methanol, 104 ml. of methanolic ammonia (5.3 molar) and 7.2 g. of hydroxylamine-O-sulfonic acid (95%).

After working up, treatment with hexane/ethyl acetate caused the resulting residue to crystallize. In this manner there were obtained 11.0 g. of 5α-androstane-3-spiro-of 125–130° C.

The infrared spectrum (KBr) showed characteristic 3'-diazirine-17-spiro-3''-diaziridine with a melting point bands at 1579 cm.$^{-1}$ (N=N) and 3220 cm.$^{-1}$ (N—H).

By subcutaneous administration of doses of 1 to 5 mg./kg./day for 3 days there was found a significant antiestrogenic effect. Doses of 15 mg./kg./day for 12 days (GES-test) resulted in an increase of the body weight, the weight of levator ani, testes, thyroidea and adrenal glands, but in decrease of the weight of prostate and thymus with no effect on seminal vesicles and preputial gland, i.e. no androgenic effect.

EXAMPLE 9

5α-androstane-3-spiro-3'-diaziridine-17-spiro-3''-diaziridine 17.0 g. of 5α-androstane-3,17-dione were dissolved in a mixture of 200.0 ml. of dry benzene and 100.0 ml. of cyclohexylamine, and the solution was refluxed for 20 hours with continuous removal of the water formed. Thereafter, 100.0 ml. of dry ethanol were added, and then 250 ml. were distilled off in the course of 6 hours. The solution was evaporated to dryness in vacuo, and the resulting residue was recrystallized from petroleum ether. In this manner there were obtained 16.9 g. of 5α-androstane-3,17-dicyclohexylimine. After a further recrystallization from ethyl acetate a melting point of 132–138° C. was obtained. The infrared spectrum (KBr) showed bands at 1650 cm.$^{-1}$ (C=N) and 1674 cm.$^{-1}$ (C=N).

4.7 g. of the above 3,17-dicyclohexylimine were treated in the manner previously described, using 120.0 ml. of dry methanol, 42.0 ml. of methanolic ammonia (5.0 molar) and 3.7 g. of hydroxylamine-O-sulfonic acid (95%).

After working up, 3.2 g. of 5α-androstane-3-spiro-3'-diaziridine-17-spiro-3''-diaziridine were obtained. The infrared spectrum (KBr) showed a characteristic band at 3200 cm.$^{-1}$ (N—H).

This substance was further purified by recrystallization from isopropyl ether and ethyl acetate. In this manner a melting point of 145–149° C. was obtained.

Analysis.—Calcd. for $C_{19}H_{32}N_4$ (percent): N, 17.70. Found (percent): N, 17.52.

By subcutaneous administration of 5 mg./kg./day for 3 days there was found a significant antiestrogenic effect and a weak androgenic and antiandrogenic effect.

EXAMPLE 10

5α-androstane-3-spiro-3'-diaziridine-17-spiro-3''-diazirine 13.6 g. of the 3,17-dispiro-diaziridine described in Example 9 (crude) were dissolved in a mixture of 800 ml. of chloroform and 40.0 ml. of triethylamine. With cooling in ice water, a solution of 13.7 g. of bromine in 150.0 ml. of chloroform was added dropwise with stirring in the course of a couple of hours. After stirring for additionally ½ hour shaking out with water, dilute hydrochloric acid solution, water, NaHCO$_3$ solution and water was performed. The chloroform solution was dried over Na$_2$SO$_4$ and evaporated to dryness in vacuo.

The resulting residue was dissolved in benzene and chromatographed on 500 g. of silica gel. After eluation with benzene and evaporation the residue crystallized with methanol, and in this manner 6.9 g. of 5α-androstane-3-spiro-3'-diazirine-17-spiro-3''-diazirine were obtained. After recrystallization from methanol a melting point of 100–102° C. was obtained. The infrared spectrum (KBr) showed a characteristic band at 1575 cm.$^{-1}$ (N=N).

Analysis.—Calcd. for $C_{19}H_{28}N_4$ (percent): C, 73.04; H, 9.03; N, 17.93. Found (percent): C, 73,22; H, 8.94; N, 17.96.

Doses of 30–200 mg./kg./day of the compound for 10 days gave a weak androgenic activity when the compound is administered orally. By subcutaneous administration of smaller doses there was found no androgenic effect and only a doubtful antiandrogenic effect. A dose of 8 mg./kg./day for 12 days (GES-test) resulted in a significant reduction of the weight of levator ani, thymus and the preputial gland with no influence on the other organs. Thus, the compound showed an antiandrogenic effect in GES-test.

EXAMPLE 11

3β-hydroxy-Δ$^5$-androstene-17-spiro-3'-(1'(2')-methyl)-diaziridine 10.0 g. of the 3β-acetoxy-Δ$^5$-androstene-17-spiro-3'-diazirine described in Example 2 were dissolved in 500 ml. of dry ether. After cooling in ice water, 50.0 ml. of a 2.8 molar ether solution of methyl magnesium bromide were added with stirring.

After stirring at 0° C. for a couple of hours and thereafter at room temperature for about 72 hours, ether and a 10% solution of ammonium chloride were added, followed by shaking out. The aqueous phase was shaken out once more with ether, and the combined ether phases were washed twice with water, dried over Na$_2$SO$_4$ and evaporated to dryness in vacuo.

The residue was dissolved in 200.0 ml. of methanol, admixed with a solution of 5.0 g. of potassium carbonate in 35.0 ml. of water, heated to boiling for a short while and allowed to stand overnight at room temperature. Thereafter, water was added, and extraction with ether was performed. The ether solution was washed with NaHCO$_3$ solution and water, dried over Na$_2$SO$_4$ and evaporated to dryness in vacuo. The resulting residue was dissolved in benzene and chromatographed on 300 g. of silica gel (deactivated with 25% water). After eluation with acetone/hexane, evaporation and recrystallization from acetone 5.3 g. of 3β-hydroxy-Δ⁵-androstene-17-spiro-3'-(1'(2')-methyl)-diaziridine were obtained. After a further recrystallization from acetone a melting point of 183–185° C. was obtained. The infrared spectrum (KBr) showed a characteristic band at 3280 cm.$^{-1}$ (N—H).

*Analysis.*—Calcd. for $C_{20}H_{32}N_2O$ (percent): C, 75.90; H, 10.19; N, 8.85. Found (percent): C, 75.64; H, 10.06; N, 8.83.

This compound showed no androgenic effect, but some antibiotic activity, e.g. against *Mycobacterium avium* and *Trichophyton mentagrophytes* in concentrations of less than 10 mg. per ml.

EXAMPLE 12

3-ethylenedioxy-Δ⁵-estrene-17-spiro-3'-diazirine (1) 3 - ethylenedioxy-17β-hydroxy-Δ⁵-estrene.—100.0 g. of 19-nor-testosterone were dissolved in 1.5 liters of benzene and admixed with 300 ml. of ethylene glycol and 10.0 g. of adipic acid. The mixture was refluxed for about 96 hours with continuous water separation. Thereafter the mixture was cooled, washed with NaHCO₃ solution and water, dried over Na₂SO₄ and evaporated to dryness in vacuo. The residue was treated with 500 ml. of ether, and the substance formed was filtered off.[1] The filtrate was evaporated to dryness and dissolved in 100 ml. of hot ether. After standing for about 24 hours at 0° C. 56.0 g. of 3 - ethylene - dioxy - 17β - hydroxy - Δ⁵ - estrene were separated by filtration. After recrystallization from ether/acetone, this compound had a melting point of 112–116° C.

(2) 3 - ethylenedioxy - 17 - oxo - Δ⁵ - estrene.—56.0 g. of 3 - ethylenedioxy - 17β - hydroxy - Δ⁵ - estrene were dissolved in 1000 ml. of pyridine and, with stirring at 10° C., admixed with 50.0 g. of chromium trioxide in the course of about 6 hours. After stirring for additionally 16 hours, there was evaporated in vacuo, and the residue was extracted four times with ether, each time with 250 ml. The combined ether extracts were dried over Na₂SO₄ and evaporated to dryness in vacuo, and the residue was recrystallized from methanol. In this manner there were obtained 22.0 g. of 3-ethylenedioxy - 17 - oxo-Δ⁵-estrene with a melting point of 155–157° C.

(3) 3 - ethylenedioxy - Δ⁵ - estrene - 17 - cyclohexylimine.—22.0 g. of 3 - ethylenedioxy - 17 - oxo - Δ⁵-estrene were dissolved in 200.0 ml. of cyclohexylamine and refluxed for about 24 hours, while N₂ was bubbled through. Thereafter, evaporation to dryness in vacuo was carried out, and the residue was recrystallized from ethanol. In this manner there was obtained 19.0 g. of 3-ethylenedioxy - Δ⁵ - estrene-17-cyclohexylimine with a melting point of 160–165° C. The infrared spectrum (KBr) showed a characteristic band at 1680 cm.$^{-1}$ (C=N).

*Analysis.*—Calcd. for $C_{26}H_{39}NO_2$ (percent): N, 3.42. Found (percent): N, 3.40.

(4) 3 - ethylenedioxy - Δ⁵ - estrene - 17 - spiro - 3'-diaziridine.—19.0 g. of 3-ethylenedioxy - Δ⁵ - estrene-17-cyclohexylimine were treated in the manner previously described, using 600 ml. of dry methanol, 50.0 ml. of methanolic ammonia (5.0 molar) and 6.5 g. of hydroxylamine-O-sulfonic acid (95%). However, in the working up chloroform was used instead of methylene chloride. After evaporation, 15.7 g. of 3-ethylenedioxy-Δ⁵ - estrene - 17 - spiro - 3' - diaziridine were obtained. The infrared spectrum (KBr) showed a characteristic band at 3240 cm.$^{-1}$ (NH).

(5) 3 - ethylenedioxy - Δ⁵ - estrene - 17 - spiro - 3'-diazirine.—15.7 g. of 3-ethylenedioxy - Δ⁵ - estrene - 17-spiro-3'-diaziridine (crude) were dissolved in 640 ml. of methanolic potassium hydroxide (7.5 N). This solution was added dropwise to a mixture of 19.2 g. of silver nitrate in 500 ml. of water and 500 ml. of chloroform with stirring at 0° C. After stirring for 16 hours filtration was performed, the filtrate was evaporated in vacuo, and thereafter chloroform was added. Thereupon, the mixture was washed with water until the washings showed neutral reaction, and the chloroform solution was dried over Na₂SO₄ and evaporataed to dryness in vacuo. The resulting residue was recrystallized twice from 96% ethanol, and in this manner there was obtained 4.4 g. of 3-ethylenedioxy - Δ⁵ - estrene - 17 - spiro-3'-diazirine with a melting point of 132–134° C. The infrared spectrom (KBr) showed a characteristic band at 1585 cm.$^{-1}$ (N=N).

*Analysis* (after drying for about 72 hours in high vacuo.—Calcd. for $C_{20}H_{28}N_2O_2$ (percent): C, 73.14; H, 8.59; N, 8.53. Found (percent): C, 73.16; H, 8.68; N, 8.28.

This compound is a useful intermediate for producing the compound of the following Example 13.

EXAMPLE 13

3-oxo-Δ⁴-estrene-17-spiro-3'-diazirine 4.4 g. of 3-ethylenedioxy - Δ⁵ - estrene - 17 - spiro-3'-diazirine were admixed with 220.0 ml. of methanol and 55.0 ml. of 2 N sulfuric acid and heated at 60° C. for one hour. After cooling, 55.0 ml. of 2 N sodium hydroxide and 200.0 ml. of water were added, and there was extracted three times with ether. The combined ether phases were washed with water, dried over Na₂SO₄ and evaporated to dryness in vacuo. The resulting residue was recrystallized twice from dry ethanol, and in this manner there was obtained 2.3 g. of 3-oxo-Δ⁴-estrene-17-spiro-3'-diazirine with a melting point of 138–140° C. The infrared spectrum (KBr) showed bands at 1575 cm.$^{-1}$ (N=N), 1615 cm.$^{-1}$ (C=C) and 1665 cm.$^{-1}$ (C=O). The ultraviolet spectrum showed a maximum at 240 mμ (ε=17900) in 96% ethanol.

*Analysis.*—Calcd. for $C_{18}H_{24}N_2O$ (percent): C, 76.02; H, 8.51; N, 9.95. Found (percent): C, 76.18; H, 8.37; N, 9.80.

This compound has an antiandrogenic activity. By subcutaneous administration of 20 mg./kg./day for 10 days there was found a weak antiandrogenic activity and by subcutaneous administration of about 120 mg./kg./day for 3 days there was found a weak antiestrogenic effect. By the same administration of 2 mg./kg./day for 5 days there was found no gestagenic activity.

EXAMPLE 14

3-hydroxyestra-1,3,5(10)-triene-17-spiro-3'-diaziridine

Preparation from 3-hydroxyestra-1,3,5(10)-triene-17-cyclohexylimine.

30.0 g. of estrone were dissolved in 300 ml. of freshly distilled cyclohexylamine. The resulting solution was refluxed for 20 hours, while dry nitrogen was supplied at a slow rate, and then evaporated to dryness in vacuo. Methanol was added to the resulting residue, and after standing for a short while the resulting crystals were separated by filtration and washed with dry methanol. In this manner there was obtained 37.2 g. of 3-hydroxyestra-1,3,5(10)triene-17-cyclohexylimine with a melting point of 258–260° C. Recrystallization from ethylacetate gave a melting point of 260–262° C. and the following analysis:

Calcd. for $C_{24}H_{33}NO$ (percent): C, 82.00; H, 9.46; N, 3.98. Found (percent): C, 82.22; H, 9.59; N, 4.10.

The infrared spectrum (KBr) showed a characteristic band at 1662 cm.$^{-1}$ (C=N).

10.6 g. of the above 3-hydroxyestra-1,3,5(10)-triene-17-cyclohexylimine were dissolved in 800 ml. of dry methanol. The solution was cooled in a mixture of ice and water and admixed with 32.0 ml. of methanolic ammonia (9.5 molar). 4.2 g. of hydroxylamine-O-sulfonic acid (95%) were then added portionwise with stirring, and after stirring for a couple of hours in the cold and subsequently for about 12 hours at room temperature the

---

[1] The substance filtered off gave, after recrystallization from ether/acetone, 34.0 g. of 3-ethylenedioxy-17β-hydroxy-Δ⁴-estrene with a melting point of 173–175° C.

reaction mixture was evaporated almost to dryness in vacuo. Methylene chloride was added, the mixture was shaken three times with water, and the methylene chloride phase was dried over $Na_2SO_4$ and evaporated to dryness in vacuo. The resulting residue was recrystallized directly from 99% ethanol, yielding 4.5 g. of 3-hydroxyestra-1,3,5(10)-triene-17-spiro-3'-diaziridine with a melting point of 194 to 197° C. From the mother liquor additional 1.0 g. of the same purity was obtained.

*Analysis.*—Calcd. for $C_{18}H_{24}N_2O$ (percent): C, 76.02; H, 8.51; N, 9.85. Found (after drying at 50° C. in high vacuo) (percent): C, 76.05; H, 8.43; N, 9.97.

The infrared spectrum (KBr) showed no band for C=N, but a characteristic band at 3160 cm.$^{-1}$ (NH).

In biological tests, 3-hydroxyestra-1,3,5(10)-triene-17-spiro-3'-diaziridine showed by subcutaneous administration the following activities:

An estrogenic activity corresponding to 1/30 of that of estrone.
An antiestrogenic effect in doses $\geq$ 10 mg./kg./day for 3 days.
An antigestagenic effect in doses $\geq$ 20 μ g./kg./day for 5 days.
An antifertility effect in doses $\geq$ about 1 mg./kg./day for 6 days.
A gonadotropine activity in doses $\geq$ 0.1 mg./kg./day for 10 days.

There was found no gestagenic activity in doses $\leq$ 2 mg./kg./day for 5 days and no androgenic and no antiandrogenic activity in doses $\leq$ about 15 mg./kg./day for 7 days.

Fertility was eliminated completely by oral administration of doses $\geq$ 5 mg./kg./day for 6 days.

EXAMPLE 15

3-methoxyestra-1,3,5(10)-triene-17-spiro-3'-diaziridine 18.0 g. of 3-methoxyestra-1,3,5(10)-triene-17-cyclohexylimine prepared in a similar manner as the cyclohexylimine compound of Example 14, were dissolved in 500 ml. of dry methanol. The solution was treated in the same manner as described in Example 14, adding 98.0 ml. of methanolic ammonia (5.0 molar) and 9.6 g. of hydroxylamine-O-sulfonic acid (95%). After working up and evaporating in dryness the residue was recrystallized from ethyl acetate. In this manner there was obtained 4.8 g. of 3-methoxyestra-1,3,5(10)-triene-17-spiro-3'-diaziridine with a melting point of 116 to 121° C.

*Analysis.*—Calcd. for $C_{19}H_{26}N_2O$ (percent): N, 9.39. Found (percent): N, 9.21.

The infrared spectrum (KBr) showed a characteristic band at 3220 cm.$^{-2}$ (NH).

EXAMPLE 16

3-hydroxyestra-1,3,5(10)-triene-17-spiro-3'-diazirine 2.5 g. of 3-hydroxyestra-1,3,5(10)-triene-17-spiro-3'-diaziridine were dissolved in 40 ml. of pyridine and cooled in a mixture of ice and water. The resulting mixture was added to a mixture of 2.5 g. of $CrO_3$ in 40 ml. of pyridine previously cooled to about 0° C. After standing in a mixture of ice and water for some minutes, and then at room temperature for about 19 hours the reaction mixture was admixed with ethyl acetate and filtered. The filtrate was shaken first with dilute hydrochloric acid and then with water, $Na_2CO_3$ solution and again with water. The organic phase was dried over $Na_2SO_4$ and evaporated to dryness in vacuo.

The resulting residue was dissolved in benzene, and upon chromatography over silica gel, eluation with benzene, and subsequent evaporation there was obtained a residue, which upon recrystallization from methanol yielded 1.0 g. of 3-hydroxyestra-1,3,5(10)-triene-17-spiro-3'-diazirine with a melting point of 135 to 138° C.

*Analysis.*—Calcd. for $C_{18}H_{22}N_2O$ (percent): N, 9.92. Found (percent): N, 9.82.

Oral administration of the compound in a dose of about 1.5 mg./kg./day for 6 days showed a strong influence on fertility in that only one animal among 8 animals became pregnant. The estrogenic effect is about 2% of that of ethinylestradiol, and the estrogenic effect by subcutaneous administration corresponds to 2% of the effect of estrone.

EXAMPLE 17

3-hydroxyestra-1,3,5(10)-triene-17-spiro-3'-(1'(2')-methyl)-diaziridine 1.0 g. of 3-hydroxyestra-1,3,5(10)-triene-17-spiro-3'-diazirine was dissolved in 50.0 ml. of dry ether, and 7.0 ml. of a 2.8 molar ether solution of methyl magnesium bromide was slowly added dropwise with stirring.

After stirring at room temperature for about 72 hours, 10% ammonium chloride solution and ether were added, whereafter the mixture was shaken out. The aqueous phase was shaken out once more with ether, and the combined ether phases were washed twice with water and dried over $Na_2SO_4$ and evaporated to dryness in vacuo. The residue was dissolved in benzene and chromatographed over 40 g. of silica gel (deactivated with 20.0 ml. of water). After eluation with 10% acetone in benzene, evaporation and recrystallization from ethyl acetate/hexane, 250 mg. of 3-hydroxyestra-1,3,5(10)-triene-17-spiro-3'-(1'(2')-methyl)-diaziridine with a melting point of 180 to 188° C. were obtained. From the mother liquor additional 110 mg. were obtained.

*Analysis.*—Calcd. for $C_{19}H_{26}N_2O$: (percent): C, 76.47; H, 8.78; N, 9.39. Found (percent): C, 76.25; H, 8.78; N, 9.17.

Subcutaneous administration of the compound showed an estrogenic activity corresponding to 10% of the activity of estrone. The fertility is strongly influenced and eliminated completely in a dose of 1 mg./kg./day for 6 days.

EXAMPLE 18

3-cyclopentoxy-estra-1,3,5(10)-triene-17-spiro-3'-diazirine 5.5 g. of cyclopentoxy-estra-1,3,5(10)-triene-17-one were dissolved in a mixture of 20 ml. of cyclohexylamine, 100 ml. of dry methanol and 20 g. of the ammonium salt of p-toluene sulfonic acid and refluxed for 24 hours. The solution was concentrated in vacuo, admixed with ether and shaken three times with a mixture of ice and water, dried over $Na_2SO_4$ and evaporated to dryness in vacuo. The residue gave after crystallization from acetone 5.6 g. of the cyclohexylimine of 3-cyclopentoxy-estra-1,3,5(10)-triene-17-one having a melting point of 106 to 109° C. The infrared spectrum (KBr) showed a band at 1675 cm.$^{-1}$ (C=N).

4.5 g. of the cyclohexylimine of 3-cyclopentoxy-estra-1,3,5(10)-triene-17-one were dissolved in 180 ml. of dry methanol, cooled in a mixture of ice and water and admixed with 10.0 g. of the ammonium salt of the p-toluenesulfonic acid and 13.6 ml. of 7.9 molar methanolic ammonia and while stirring with 1.36 g. of hydroxylamine-O-sulfonic acid (98%). The mixture was stirred on ice bath for a couple of hours and then overnight at room temperature. The reaction mixture was admixed with methylene chloride and water, the methylene chloride phase was separated and the aqueous phase extracted twice with methylene chloride. The combined methylene chloride phases were shaken twice with water, dried over $Na_2SO_4$ and evaporated to dryness in vacuo. The residue was dissolved in a mixture of acetone and hexane. After standing in refrigerator a precipitate was formed which was filtered off. The filtrate was evaporated in vacuo to form a yellowish oil which liberates iodine from an acid sodium iodide solution. The yield was 3.3 g. of crude 3 - cyclopentoxy - estra - 1,3,5(10) - triene - 17 - spiro - 3'-diaziridine.

The 3.3 g. of 3 - cyclopentoxy - estra - 1,3,5(10)-triene-

17 - spiro - 3' - diaziridine were dissolved in 200 ml. of chloroform, admixed with 10 ml. of triethyl amine and cooled on icebath. 1.5 g. of Br dissolved in 20 ml. of chloroform were added dropwise while stirring, whereafter stirring on icebath was performed during one and a half hours. The reaction mixture was shaken three times with water, dried over $Na_2SO_4$ and evaporated to dryness in vacuo. By trituration in methanol the residue yielded 1.7 g. of crude crystalline cyclopentoxy-estra-1,3,5(10) - triene - 17 - spiro - 3' - diazirine. After having chromatographed over 200 g. of silica gel and eluated with benzene 1.26 g. of pure 3 - cyclopentoxy - estra-1,3,5(10) - triene - 17 - spiro - 3' - diazirine having a melting point of 117 to 120° C. were obtained. The infrared spectrum (KBr) showed bands at 1566 cm.$^{-1}$ and 1577 cm.$^{-1}$ (aromatic ring and N=N).

*Analysis.*—Calcd. (percent): N, 7.99. Found (percent): N, 7.98.

During the first three pregnancy days fertility was eliminated completely by oral administration of about 1 mg./kg./day. The oral estrogenic effect is about 1/500 of that of ethinylestradiol.

EXAMPLE 19

3-(2'-tetrahydropyranyloxy)-estra-(1,3,5(10))-triene-17-spiro-3''-diazirine 10 g. of 3 - (2' - tetrahydropyranyloxy) - estra - (1,3,5(10)) - triene - 17 - one were dissolved in 100 ml. of cyclohexylamine and refluxed for 20 hours, evaporated to dryness in vacuo and crystallized with ethyl acetate. Yield: 3.7 g. of the cyclohexylamine of 3 - (2' - tetrahydropyranyloxy) - estra - (1,3,5(10)) - triene - 17 - one having a melting point of 128 to 131° C.

The infrared spectrum (KBr) showed a band at 1669 cm.$^{-1}$ (C=N). From the mother liquor additional 3.0 g. of the imine were recovered.

3.7 g. of the cyclohexylimine of 3 - (2 ' - tetrahydropyranyloxy) - estra - (1,3,5(10)) - triene - 17 - one were dissolved in 150 ml. dry methanol, cooled in a mixture of ice and water and admixed with 8.05 g. of the ammonium salt of the p-toluene sulfonic acid, 11.95 ml. of 7.2 molar methanolic $NH_3$ and while stirring with 1.13 g. of 95% hydroxylamine-O-sulfonic acid. The mixture was stirred on ice bath for a couple of hours and then overnight at room temperature. The reaction mixture was admixed with methylene chloride and water, the methylene chloride phase was separated and the aqueous phase extracted twice with methylene chloride. The combined methylene chloride phases were shaken twice with water, dried over $Na_2SO_4$ and evaporated to dryness in vacuo. Yield: 3.2 g. of 3 - (2' - tetrahydropyranyloxy) - estra-(1,3,5(10))-triene-17-spiro-3''-diazirindine.

The compound was oxidized in the usual manner with bromine and triethylamine in chloroform to form 3-(2'-tetrahydropyranyloxy) - estra - (1,3,5(10)) - triene-17-spiro-3''-diazirine. After chromatography on silica gel the compound was obtained in an analytically pure state with a melting point of 118 to 121° C.

The infrared spectrum (KBr) showed bands at 1575 cm.$^{-1}$ and 1605 cm.$^{-1}$ (aromatic ring and N=N).

What we claim is:

1. A steroid of the androstane and estrane series selected from a member of the group having the formula:

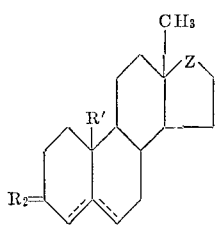

and

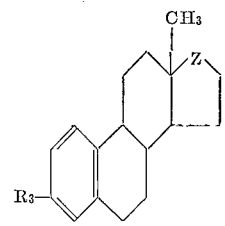

wherein the dotted lines mean the optional presence of double bonds,

Z designates a structure selected from the group consisting of

and

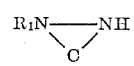

wherein:

$R_1$ is selected from the group consisting of hydrogen and lower alkyl, $R'$ is selected from the group consisting of methyl and hydrogen, $R_2$ is selected from the group consisting of an oxygen atom, one hydrogen atom and one lower alkoxy group, one hydrogen atom and one hydroxy group, one hydrogen atom and one lower alkanoyl group, an ethylenedioxy group, and when ring A is saturated, a diazirine or diaziridine group, and $R_3$ is selected from the group consisting of hydroxyl, lower alkoxy, lower alkanoyl, lower cycloalkyloxy and pyranyloxy.

2. A steroid as claimed in claim 1 and having the formula 3β-hydroxy-Δ$^5$-androstene-17-spiro-3'-diaziridine.

3. A steroid as claimed in claim 1 and having the formula 3β-acetoxy-Δ$^5$-androstene-17-spiro-3'-diazirine.

4. A steroid as claimed in claim 1 and having the formula 3-oxo-Δ$^4$-androstene-17-spiro-3'-diazirine.

5. A steroid as claimed in claim 1 and having the formula 3-oxo-5α-androstane-17-spiro-3'-diazirine.

6. A steroid as claimed in claim 1 and having the formula 5α - androstane-3-spiro-3'-diazirine-17-spiro-3''-diazirine.

7. A steroid as claimed in claim 1 and having the formula 3β - hydroxy-Δ$^5$-androstene-17-spiro-3'-(1'(2')-methyl)-diaziridine.

8. A steroid as claimed in claim 1 and having the formula 3-oxo-Δ$^4$-estrene-17-spiro-3'-diazirine.

9. A steroid as claimed in claim 1 and having the formula 3 - methoxy - estra-1,3,5(10)-triene-17-spiro-3'-diazirine.

10. A steroid as claimed in claim 1 and having the formula 3 - hydroxy - estra-1,3,5(10)-triene-17-spiro-3'-diaziridine.

11. A steroid as claimed in claim 1 and having the formula 3α-hydroxy-5α-androstane-17-spiro-3'-diaziridine.

12. A steroid as claimed in claim 1 and having the formula 3α-methoxy-5α-androstane-17-spiro-3'-diazirine.

13. A steroid as claimed in claim 1 and having the formula 3α-acetoxy-5α-androstane-17-spiro-3'-diazirine.

14. A steroid as claimed in claim 1 and having the formula 5α - androstane-3-spiro-3'-diazirine-17-spiro-3''-diaziridine.

15. A steroid as claimed in claim 1 and having the formula 5α-androstane-3-spiro-3'-diaziridine-17-spiro-3''-diaziridine.

16. A steroid as claimed in claim 1 and having the formula 3 - ethylenedioxy - Δ$^5$ - estrene - 17 - spiro - 3'-diaziridine.

17. A steroid as claimed in claim 1 and having the formula 3 - hydroxy - estra-1,3,5(10)-triene-17-spiro-3'-(1'(2')-methyl)-diaziridine.

18. A steroid as claimed in claim 1 and having the formula 3 - cyclopentoxy-estra-1,3,5(10)-triene-17-spiro-3'-diazirine.

19. A steroid as claimed in claim 1 and having the formula 3 - (2' - tetrahydropyranyloxy)-estra-1,3,5(10)-triene-17-spiro-3''-diazirine.

20. 3 - hydroxy - estra - 1,3,5(10)-triene-17-spiro-3'-diazirine.

References Cited
UNITED STATES PATENTS
3,445,461 5/1969 Borrevang et al. ____ 260—239.5

ELBERT L. ROBERTS, Primary Examiner

U.S. Cl. X.R.

260—239.55; 424—241